(No Model.)

R. C. DOBBS.
CAR COUPLING.

No. 356,626. Patented Jan. 25, 1887.

Witnesses
Otto Hufeland
William Miller

INVENTOR
Richard C. Dobbs
BY Van Santvoord & Hauff
ATTORNEYS

UNITED STATES PATENT OFFICE.

RICHARD C. DOBBS, OF GUTTENBERG, NEW JERSEY.

CAR-COUPLING.

SPECIFICATION forming part of Letters Patent No. 356,626, dated January 25, 1887.

Application filed December 9, 1886. Serial No. 221,114. (No model.)

*To all whom it may concern:*

Be it known that I, RICHARD C. DOBBS, a citizen of the United States, residing at Guttenberg, in the county of Hudson and State of New Jersey, have invented new and useful Improvements in Car-Couplings, of which the following is a specification.

This invention relates to improvements in car-couplings, as fully set forth in the following specification and claims and illustrated in the accompanying drawings, in which—

Figure 1:
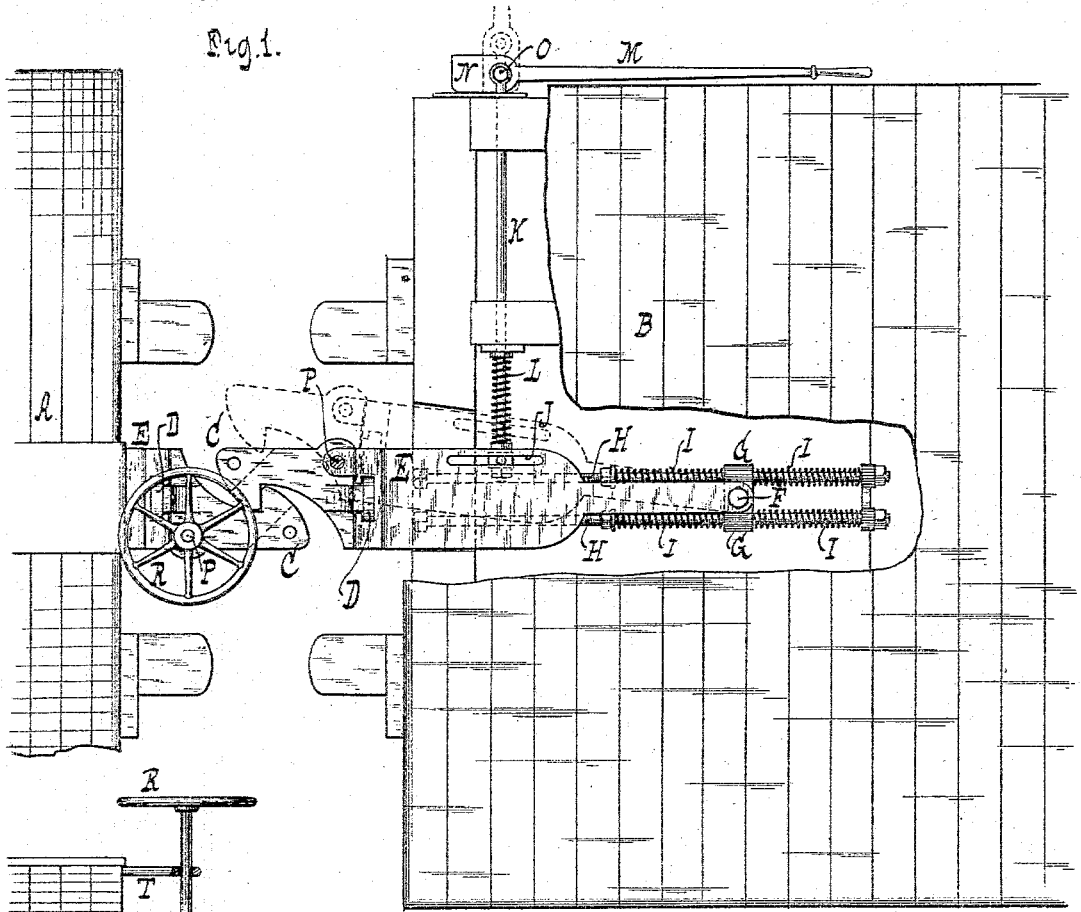
Figure 2:
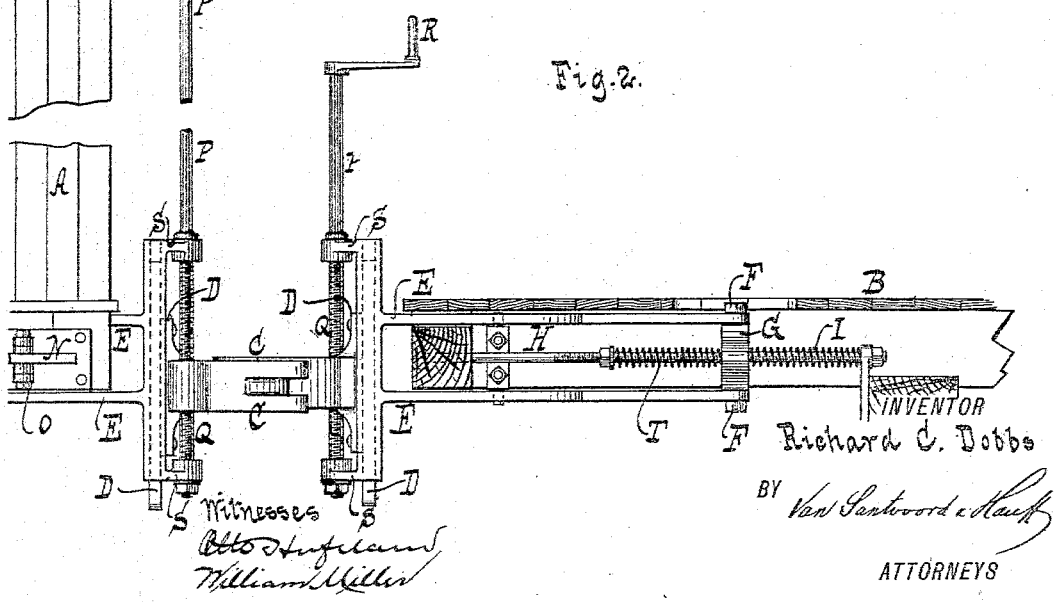

Figure 1 is a plan view of a box-car and a platform-car containing my invention. Fig. 2 is a side elevation, partly in section, of Fig. 1.
Similar letters indicate corresponding parts.

In the drawings, the letter A designates a box-car, and B a platform-car, said cars being coupled together by clutches C C. The clutches C are connected to the draw-bars E. Each draw-bar E is connected by a pivot, F, to a slide, G, movable on rods or ways H, firmly secured to the car. Springs I, suitably applied or fixed on the ways H, hold the slide G in a fixed position on the ways H. When said slide G is moved either forward or backward in consequence of the car being suddenly started forward or backward through power applied at the clutch C, the springs I take up the shock of such starting.
The pivot F allows the clutch C to swing aside, as shown in dotted lines in Fig. 1, so that the cars may be uncoupled from one another. A slot, J, in the draw-bar E allows of making a movable connection—as, for example, by a pin or hook between the draw-bar E and the bar K. A pivot, O, connects the bar K to the lever M, and by swinging the lever M away from the side of the car to the position indicated in dotted lines in Fig. 1 the end N of the lever M, striking against the side of the car, will draw the clutch C aside, as indicated in dotted lines in Fig. 1. As the lever M is placed at such a height as to be accessible to an operator standing on the ground alongside of the car, the car can be readily uncoupled without its being necessary for the operator to mount onto the car. A spring, L, suitably applied, tends to hold the clutch C in its coupling position. (Shown in full lines in Fig. 1.) As seen in Fig. 2, the draw-bar E, by being made forked, will engage the pivot F above and below the slide G, thus bringing the strain to bear evenly on the slide G.

In order to enable the clutch C to be used in coupling with cars that vary in height, as is at times the case, especially in freight-cars, the clutch C is made vertically adjustable. A tongue, D, running in a groove, enables the clutch C to move vertically on the draw-bar E, while said tongue and groove hold the clutch and draw-bar together.

The clutch C is tapped for the reception of a screw-thread, Q, on a shaft, P. The shaft P is fixed against longitudinal motion, but is free to revolve in bearings S on the draw-bar E. A handle, wheel, or crank, R, suitably applied, enables the shaft P to be turned, whereby the screw-thread Q will raise or lower the clutch C. Various clutches can thus be adjusted at the same level; also, by proper raising or lowering of the clutches C the clutches can be brought to such different levels with relation to one another as to be out of engagement with one another. The screw-thread Q can thus be operated to uncouple the car.

The handles R are placed so as to be readily accessible to a person on the car. For example, the handle R is placed near the platform of a car or near the roof of a box-car.

The screw-thread Q is placed at one side of the clutch C, as seen, so as to bring the shaft P and handle R out of the center line of the car. The center line of a train of cars is thus left free for passage. As the draw-bar E is swung sidewise, the shaft P moves with the draw-bar. In case the shaft P is of some length, it is well to steady the free end of the shaft P by suitable means, such as an arm or brace, T. The shaft P should be allowed some lateral motion in the brace T, so that the screw-thread Q on the shaft can freely move sidewise with the clutch C.

What I claim as new, and desire to secure by Letters Patent, is—

1. The combination, in a car-coupling, of a laterally-swinging coupling-hook, C, and a screw, Q, vertically adjusting said hook and rigidly holding it in any adjusted position, substantially as described.

2. The combination, in a car-coupling, of a laterally-swinging draw-bar, E, carrying a coupling-hook, C, with a screw, Q, for vertically adjusting said hook and rigidly holding it in any adjusted position, substantially as described.

3. The combination, with a hook or coupling, C, a draw-bar, E, and a suitably supported or guided slide, G, of a pivot, F, connecting the draw-bar and slide, and springs I, engaging opposite sides of the slide G, substantially as set forth.

4. The combination, with a hook or coupling, C, a forked draw-bar, E, and a suitably supported or guided slide, G, of a pivot, F, connecting the draw-bar and slide, and springs I, engaging opposite sides of the slide G, substantially as set forth.

5. The combination, with a pivot or hinge, F, and a draw-bar, E, provided with a slot, J, of a rod or bar, K, engaging the draw-bar at said slot, a spring, L, acting on said draw-bar, and an operating lever or arm, M, connected to the rod K, substantially as set forth.

I testimony whereof I have hereunto set my hand and seal in the presence of two subscribing witnesses.

RICHARD C. DOBBS. [L. S.]

Witnesses:
W. HAUFF,
E. F. KASTENHUBER.